UNITED STATES PATENT OFFICE.

INGENUIN HECHENBLEIKNER, OF CHARLOTTE, NORTH CAROLINA, ASSIGNOR TO SOUTHERN ELECTRO-CHEMICAL COMPANY, OF NEW YORK, N. Y., A CORPORATION OF NEW JERSEY.

METHOD OF MANUFACTURING PHOSPHORIC ACID.

1,112,211.

Specification of Letters Patent. Patented Sept. 29, 1914.

Application filed February 7, 1914. Serial No. 817,368.

*To all whom it may concern:*

Be it known that I, INGENUIN HECHENBLEIKNER, a subject of the Emperor of Austria-Hungary, and resident of Charlotte, in the county of Mecklenburg and State of North Carolina, have invented a certain new and useful Method of Manufacturing Phosphoric Acid, of which the following is a specification.

This invention relates to an improved method of manufacturing phosphoric acid from phosphates and the objects of the invention are to increase the efficiency of the process, to prevent any ultimate escape of phosphoric acid with the spent gases and generally to simplify and improve the process.

Further objects are to secure increased efficiency in the absorption towers, and to recover the insoluble acid from the sludge in the towers.

In the present process, vapors of phosphorus and phosphoric acid are formed in an electric furnace by heating a mixture of phosphate rock, silicious material and carbon therein. One of the difficulties which the process offers is to recover in available form, the phosphoric acid expelled. It is necessary to first insure complete oxidation of the phosphorus vapors expelled from the furnace, which is done by breaking up the stream of furnace gases by a countercurrent of oxygen and then further breaking up the combined stream of oxygen and gases to cause thorough intermixture of the same. The absorption towers operate on the countercurrent principle, the acid flowing in one direction and the gases in the opposite direction. The efficiency of the absorption is increased by cooling the circulating acid. A certain amount of insoluble phosphoric acid collects in the sludge at the bases of the towers, and this may be obtained soluble by subjecting it to the hot phosphoric acid. Various details of the process are set forth in the accompanying specification and drawing.

Figure 1:
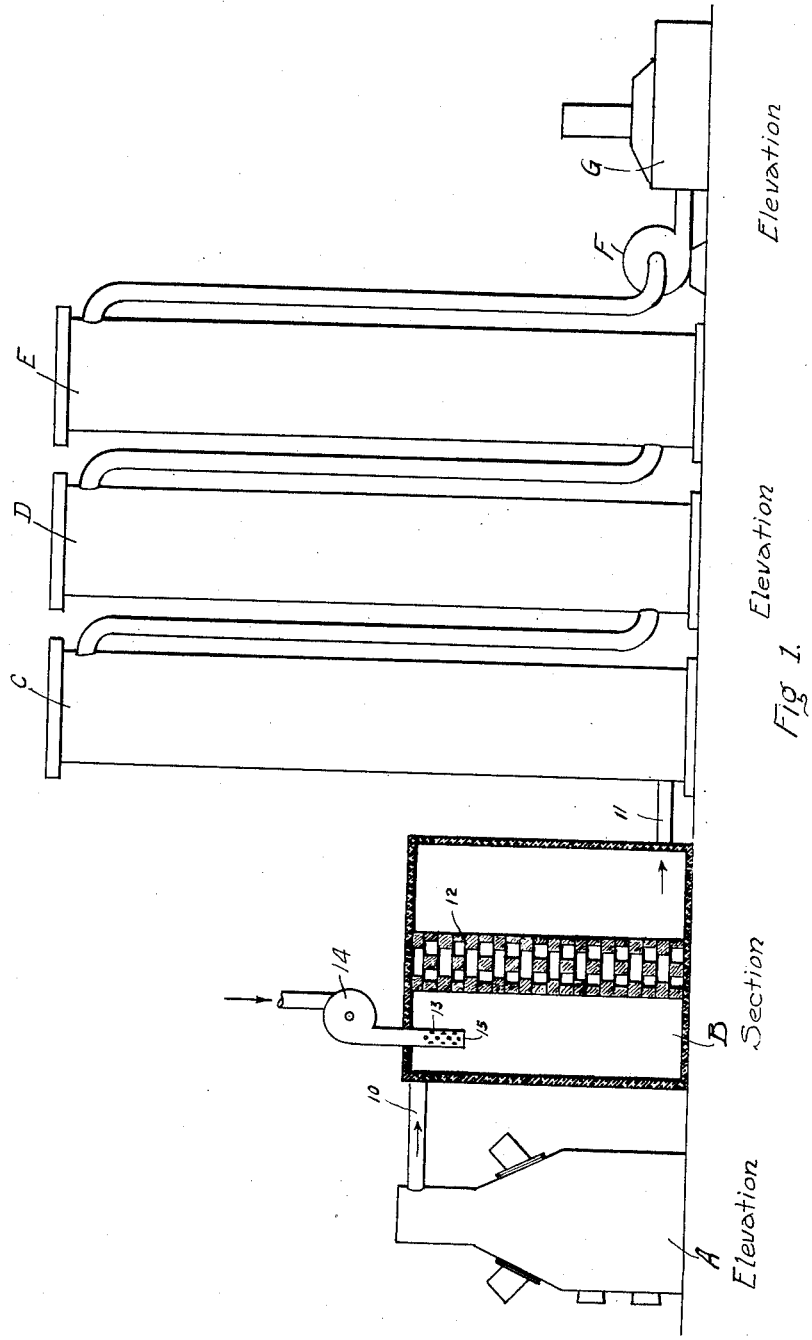
Figure 2:
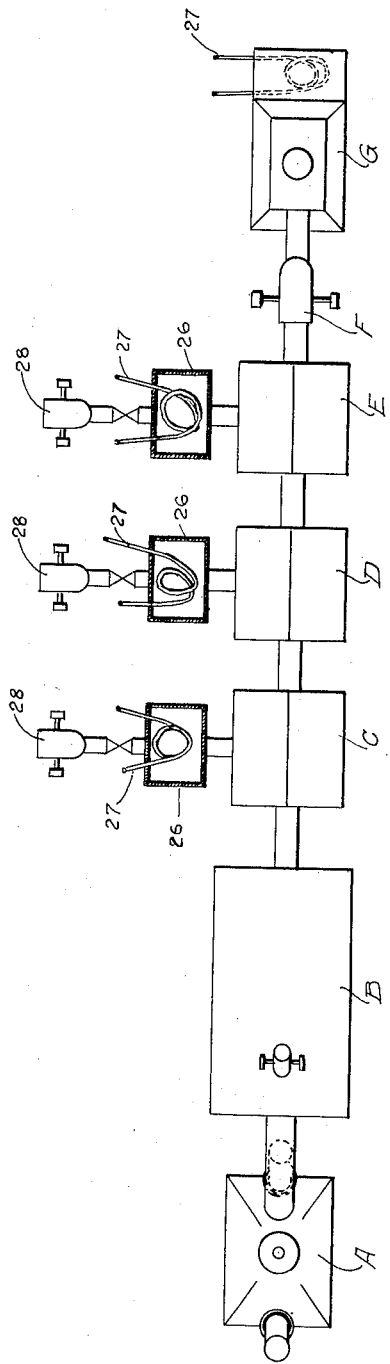
Figure 3:
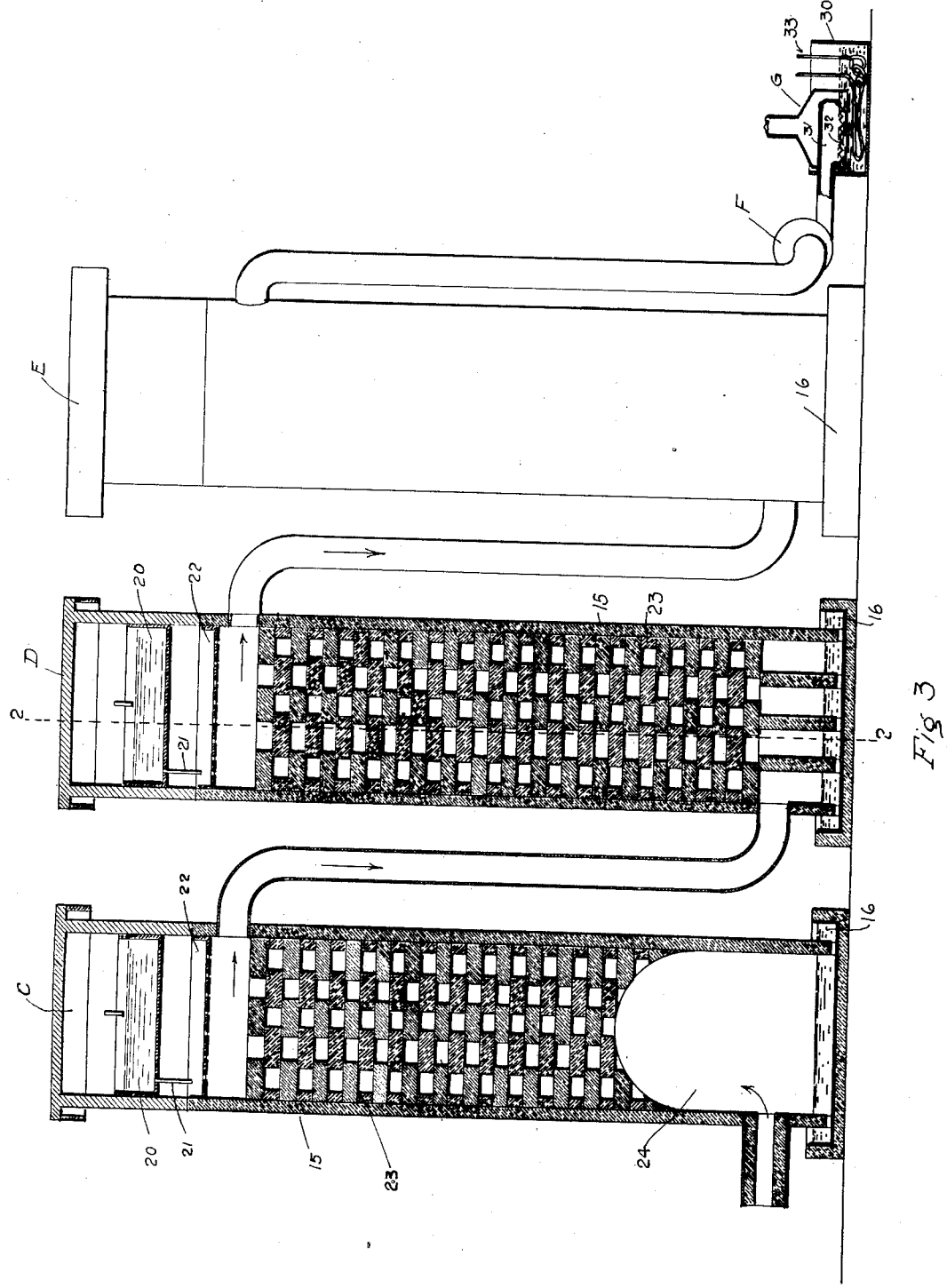
Figure 4:
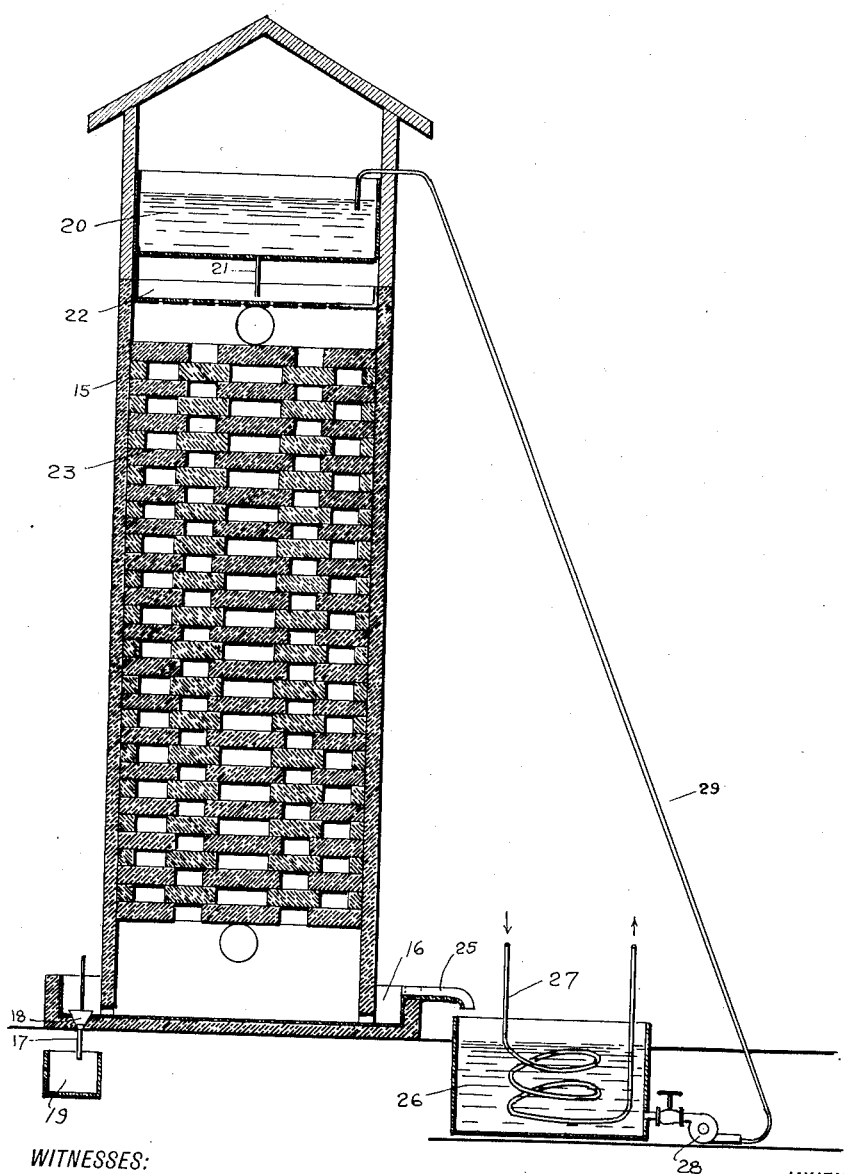

In the drawing Figure 1 is an elevation partially in section of a suitable apparatus for carrying out the process; Fig. 2 is a plan view of the same; Fig. 3 is a section and elevation of the absorption towers; and Fig. 4 is a vertical section of one of the towers taken on the line 2—2, Fig. 3.

Referring to the drawing, A represents the electric furnace for producing the stated vapors, B the oxidizing chamber, C, D and E the absorption towers, F the blower and G the gas scrubber.

The electric furnace A is of any suitable or well known design, preferably of the arc resistance type, the construction of which does not form part of the present invention.

The volatile vapors and gases resulting from the reaction in the electric furnace pass by a conduit 10 to the oxidation chamber B, entering at the top of such chamber, and the oxidized gases passing from the bottom of the oxidation chamber to the tower C by a conduit 11. These conduits and generally all parts of the apparatus will be constructed in accordance with the usual practice to resist the reaction and heat where necessary. The oxidation chamber is provided with a checkerwork partition 12, adapted to break up the stream of gases and with a distributing nozzle 13 through which oxygen or air is blown by a blower 14 or other suitable means. The oxygen discharges through a plurality of orifices 15 in the nozzle and the direction of the jets formed by the orifices is such as to produce a swirling action, certain of the jets being counter in direction to the moving stream of furnace gases drawn through the chamber and towers by the fan F.

Each of the towers C, D and F comprises an outer wall 15 of brick or the like, and a collecting tank 16 for the acid at the bottom, preferably lined with lead. This tank should be of relatively large size, so that the dirt in the sludge may have an opportunity to settle to the bottom thereof, from which the sludge may be withdrawn through an outlet 17 (see Fig. 4) normally closed by a plug valve 18, the sludge being designed to pass through the opening 17 into a suitable collector 19. Each tower is provided with a tank 20 for scrubbing acid or water from which it may pass by a pipe 21 to a distributing diaphragm 22, which is formed with suitable perforations and located above the brick checkerwork 23 which fills the body portion of the tower. The first absorption tower C is formed at the bottom with a relatively large cooling chamber 24 in which the gases may have an opportunity to cool slightly before they contact with the brick checkerwork.

The water for absorbing the vaporous phosphoric acid is introduced into the last tower E and is circulated a number of times in the tower E, then pumped to the tower D and circulated therein, then pumped to the tower C and circulated therein until it is of the required strength, when it is withdrawn, and may be cooled during circulation in each tower. By referring to Fig. 4 it will be seen that the acid overflowing from the tank 16 at the base of the tower may pass through a suitable overflow pipe 25 to an acid tank 26, in which it is cooled by a suitable water cooled coil 27 through which a refrigerant such as water is circulated, the cooled acid being pumped by a suitable pump 28 or other means through the pipe 29 to the top of the tower. After circulating several times through one tower the acid is pumped to the next tower nearer the furnace. As many towers as are necessary are provided and the spent gases from the last tower pass through the fan F to the gas scrubber G, where the final traces of phosphoric acid are caught. This scrubber is shown in detail in Fig. 3 and comprises a tank 30 containing water or weak absorbing acid, a distributing bell 31 which opens face downwardly beneath the surface of the water and a collecting bell G surrounding the bell 31. The bell 31 is provided with a serrated edge 32 to provide distribution of the gases in finer subdivision and the liquid in the tank 30 is cooled by a suitable water cooling coil 33 in order to increase the solvent action.

In carying out the complete process natural phosphate rock, silicious material and carbon may be heated in the electric furnace in the proportions represented by the following equation:

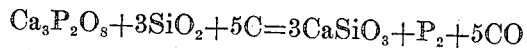
$$Ca_3P_2O_8 + 3SiO_2 + 5C = 3CaSiO_3 + P_2 + 5CO$$

The volatile phosphorus vapors with small quantities of phosphoric acid produced by air in the feed or drawn in by leaks in the furnace pass into the oxidizing chamber B and are there thoroughly oxidized by air or oxygen from 14 in the manner previously explained. The phosphoric acid thus produced then passes through the towers C, D and E and is absorbed therein. The final gases then pass through the collector G where the last traces of acid are caught. To recover any insoluble phosphoric acid in the sludge collecting at the bases of the absorption towers said sludge is collected and subjected to the action of a hot phosphoric acid solution. In some cases by adjusting the feed of acid in tower C so as to have a comparatively hot strong acid accumulating in pan 16, the sludge can be dissolved in place. Most of it is formed in tower C; but the same considerations apply in the case of D and E. Or the sludge may be withdrawn through 17 and heated with strong acid from the same, or another, tower until its contained phosphoric acid goes into solution.

What I claim is:—

1. The herein described process for manufacturing phosphoric acid which comprises first heating natural phosphate rock, silicious material and carbon to produce vapors of phosphorus, then withdrawing the furnace gases and vapors in a stream, then breaking up the stream and mixing the gases with oxygen and then absorbing the acid by an aqueous liquid in towers operated on the countercurrent system.

2. The herein described process of manufacturing phosphoric acid which comprises first heating natural phosphate rock, silicious material and carbon to produce vapors of phosphorus, withdrawing the furnace gases and vapors in a stream, breaking up the stream with a countercurrent of oxygen and then absorbing the phosphoric acid.

3. The herein described process for manufacturing phosphoric acid which comprises first heating natural phosphate rock, silicious material and carbon to produce vapors of phosphorus, then withdrawing the furnace gases and vapors in a stream, then breaking up the stream and mixing the gases with oxygen and then absorbing the acid in towers operated on the countercurrent system, and then passing the spent gases through a scrubber.

4. The herein described process for manufacturing phosphoric acid which comprises first heating natural phosphate rock, silicious material and carbon to produce vapors of phosphorus, then withdrawing the furnace gases and vapors in a stream, then breaking up the stream and mixing the gases with oxygen and then absorbing the acid in towers operated on the countercurrent system, and then passing the spent gases through a scrubber having the liquid therein cooled.

5. The herein described method of manufacturing phosphoric acid which comprises heating natural phosphate rock, silicious material and carbon to produce vapors of phosphorus, withdrawing the gases and vapors in a stream and mixing the gases with oxygen, then breaking up the combined stream of gases and oxygen and then absorbing the phosphoric acid.

6. The herein described method of manufacturing phosphoric acid which comprises heating natural phosphate rock, silicious material and carbon to produce vapors of phosphorus, withdrawing the gases and vapors in a stream and mixing the gases with oxygen, then breaking up the combined stream of gases and oxygen and then absorbing the phosphoric acid in absorption towers operated on the countercurrent principle.

7. The herein described step in the absorption of phosphoric acid by a circulating current of aqueous acid, which comprises cooling the circulating acid.

8. The herein described step in the process of absorbing phosphoric acid in suitable absorption towers by a circulating current of aqueous acids pumped from the bottom to the top of the tower which comprises cooling the circulating phosphoric acid.

9. In the process of absorbing phosphoric acid in suitable towers by countercurrents of descending liquid the herein described process which comprises collecting the sludge from the bases of the towers and subjecting it to the action of hot phosphoric acid.

10. The herein described process of manufacturing phosphoric acid which comprises heating phosphate rock, silicious material and carbon to produce vapors of phosphorus, withdrawing the furnace gases and vapors in a stream and mixing them with oxygen, passing the mixed gases through a series of absorption towers, and allowing the gases to cool slightly in a chamber before entering the checkerwork of the first tower.

11. The herein described method which comprises mixing a stream of phosphorus vapor with a countercurrent of oxygen and passing the phosphoric acid formed through absorption towers against currents of aqueous acid and cooling the acid circulating in the absorption towers.

Signed at New York city in the county of New York and State of New York this 5th day of Feb. A. D. 1914.

INGENUIN HECHENBLEIKNER.

Witnesses:
  RUSSEL B. BOVART,
  HARRY W. THOMPSON.